United States Patent
Stepp et al.

(10) Patent No.: US 12,372,962 B1
(45) Date of Patent: Jul. 29, 2025

(54) AUTOMATIC LEARNING OF RELEVANT ACTIONS IN MOBILE ROBOTS

(71) Applicant: HRL Laboratories, LLC, Malibu, CA (US)

(72) Inventors: Nigel D. Stepp, Santa Monica, CA (US); Charles E. Martin, Santa Monica, CA (US); Heiko Hoffmann, Simi Valley, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 263 days.

(21) Appl. No.: 18/067,004

(22) Filed: Dec. 15, 2022

Related U.S. Application Data

(60) Provisional application No. 63/290,617, filed on Dec. 16, 2021.

(51) Int. Cl.
*G05D 1/00* (2024.01)
*G06N 3/091* (2023.01)

(52) U.S. Cl.
CPC ........... *G05D 1/0088* (2013.01); *G06N 3/091* (2023.01)

(58) Field of Classification Search
CPC .................................................. G05D 1/0088
See application file for complete search history.

(56) References Cited

U.S. PATENT DOCUMENTS

| | | | | |
|---|---|---|---|---|
| 11,427,210 B2* | 8/2022 | Rosman | ................. | G06N 3/045 |
| 11,447,127 B2* | 9/2022 | Tawari | ................. | G06V 10/764 |
| 11,687,087 B2* | 6/2023 | Choi | ..................... | G01S 17/931 |
| | | | | 701/28 |
| 2023/0222328 A1* | 7/2023 | Wei | ......................... | G06N 3/048 |
| 2024/0096077 A1* | 3/2024 | Luo | ......................... | G06N 3/045 |

OTHER PUBLICATIONS

Martin Lohmann, Jordi Salvador, Aniruddha Kembhavi, Roozbeh Mottaghi. Learning About Objects by Learning to Interact with Them. 34th Conference on Neural Information Processing Systems (NeurIPS 2020), Vancouver, Canada, pp. 1-12.

(Continued)

*Primary Examiner* — Michael A Berns
(74) *Attorney, Agent, or Firm* — TOPE-MCKAY & ASSOCIATES

(57) ABSTRACT

Described is a system and method for robotic perception and action. The system includes a mobile autonomous platform programmed to receive a visual input related to an environment and perform a movement sequence that affects the environment based on the visual input. A neural network is in communication with the mobile autonomous platform. The neural network includes a vision autoencoder trained, based on movements of the mobile autonomous platform, to encode visual features of an object in the visual input onto a visual latent space. In addition, the neural network includes an action autoencoder trained, based on movements of the mobile autonomous platform, to encode action features of the movement sequence onto an action latent space. The neural network also includes a mapping layer between the vision autoencoder and the action autoencoder. The mapping layer decodes the visual inputs into an action output of the mobile autonomous platform.

10 Claims, 7 Drawing Sheets

(56) References Cited

OTHER PUBLICATIONS

Guang-Bin Huang, Yan-Qiu Chen and H. A. Babri, "Classification ability of single hidden layer feed forward neural networks," in IEEE Transactions on Neural Networks, vol. 11, No. 3, pp. 799-801, May 2000.
Paszke, A., Gross, S., Massa, F., Lerer, A., Bradbury, J., Chanan, G., & Chintala, S. (2019). "Pytorch: An imperative style, high-performance deep learning library", Advances in neural information processing systems, 32, (8026-8037), pp. 1-12.

* cited by examiner

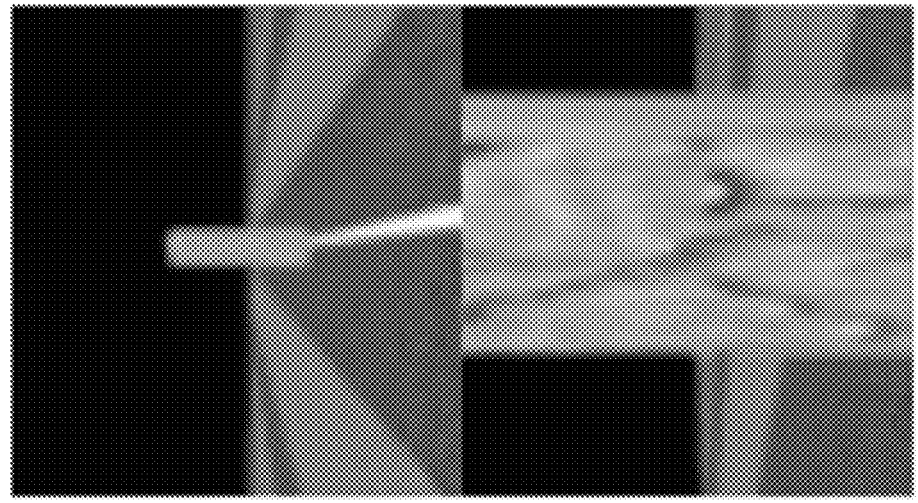
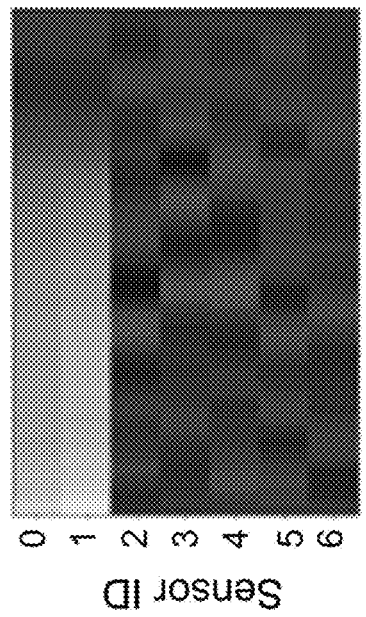
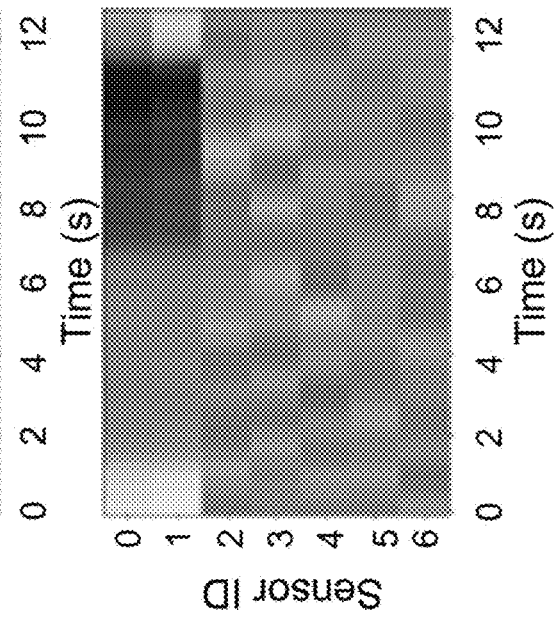
FIG. 7A
FIG. 7B
FIG. 7C
FIG. 7D

AUTOMATIC LEARNING OF RELEVANT ACTIONS IN MOBILE ROBOTS

CROSS-REFERENCE TO RELATED APPLICATIONS

This is a Non-Provisional Application of U.S. Provisional Application No. 63/290,617, filed in the United States on Dec. 16, 2021, entitled, "Automatic Learning of Relevant Actions in Mobile Robots," the entirety of which is incorporated herein by reference.

BACKGROUND OF INVENTION

(1) Field of Invention

The present invention relates to a system for automatic learning of relevant actions in mobile robots and, more particularly, to a system for allowing mobile robots to automatically discover visual features that specify relevant action possibilities.

(2) Description of Related Art

Action-specific perception describes how a person (or machine) perceives their environment in terms of their ability to act. The primary objects of perception are affordances, which are the possibilities for action. Affordances describe a relationship between the environment and the specific perceiver. Thus, similar environments are perceived differently depending on the ability of the perceiver to take action in the environment.

In machine learning, action-based perception attempts to create more meaningful perception by grounding it in actions performed by an embedded and embodied agent. Existing systems attempt to characterize only specific features of an object, such as its weight, for action-based perception. Thus, a continuing need exists for a system having a more general approach that can produce features directly related to action possibilities.

SUMMARY OF INVENTION

The present invention relates to a system for automatic learning of relevant actions in mobile robots and, more particularly, to a system for allowing mobile robots to automatically discover visual features that specify relevant action possibilities. The system includes a mobile autonomous platform programmed to receive a visual input related to an environment and perform a movement sequence that affects the environment based on the visual input. A neural network is in communication with the mobile autonomous platform. The neural network comprises a vision autoencoder trained, based on movements of the mobile autonomous platform, to encode visual features of the visual input onto a visual latent space. Additionally, the neural network includes an action autoencoder trained, based on movements of the mobile autonomous platform, to encode action features of the movement sequence onto an action latent space.

The neural network also comprises a mapping layer between the vision autoencoder and the action autoencoder. The mapping layer decodes the visual inputs into an action output of the mobile autonomous platform.

In another aspect, the mapping layer encodes a reachability affordance of the autonomous platform.

In another aspect, the visual input comprises visual features specifying action possibilities for reaching an object in the environment.

The present invention further relates to a method for automatic learning of relevant actions in mobile autonomous platforms. The method includes receiving, by a mobile autonomous platform, a visual input related to an environment; performing, by the mobile autonomous platform, a movement sequence that affects the environment; training a vision autoencoder of a neural network to encode visual features of the visual input onto a visual latent space; training an action autoencoder of the neural network to encode action features of the movement sequence onto an action latent space; learning a mapping from the visual latent space to the action latent space; and using the mapping, translating visual features to action features that specify action possibilities for the mobile autonomous platform.

In another aspect, the visual features comprise texture gradients and edge features.

In another aspect, each of the vision autoencoder and the action autoencoder is trained with a model loss function.

In another aspect, training of a mapping layer of the neural network with a model loss function is triggered when the mobile autonomous platform physically contacts an object in the environment.

In another aspect, model loss is computed separately for the vision autoencoder, the action autoencoder, and the mapping layer.

In another aspect, model loss functions are determined for vision, action, and mapping, respectively, according to the following:

$$L_V(x, y) = \frac{1}{N}\sum_n^N y_n \log \sigma(x_n) + (1 - y_n)\log(1 - \sigma(x_n))$$

$$L_A(x, y) = \frac{1}{N}\sum_n^N |x_n - y_n|$$

$$L_M(x, y) = \frac{1}{N}\sum_n^N (x_n - y_n)^2,$$

where for each loss function, x and y correspond to a decoded image and an input image for $L_V$, a decoded action and an input action for $L_A$, a mapped vision and encoded action for $L_M$, N is a number of elements in x or y, and n is an index of a specific element.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 7A is an illustration of an object at a far distance according to some embodiments of the present disclosure;

FIG. 7B is an illustration of a decoded action for the object at a far distance of FIG. 7A according to some embodiments of the present disclosure;

FIG. 7C is an illustration of an object at a close distance according to some embodiments of the present disclosure; and FIG. 7D is an illustration of a decoded action for the object at a close distance of FIG. 7C according to some embodiments of the present disclosure.

DETAILED DESCRIPTION

Figure 1:
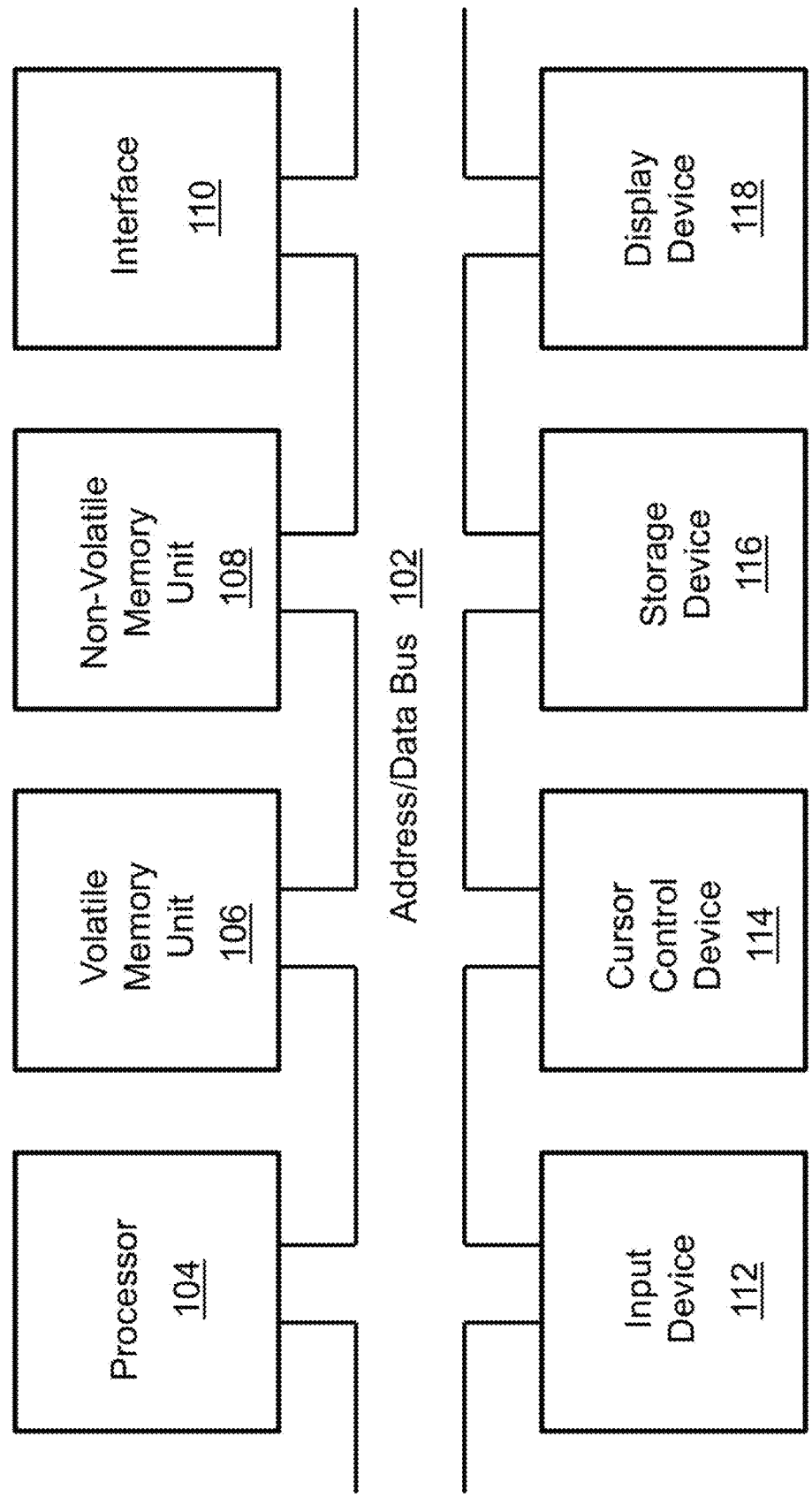
FIG. 1 is a block diagram depicting the components of a system for automatic learning of relevant actions in mobile robots according to some embodiments of the present disclosure.

The present invention relates to a system for automatic learning of relevant actions in mobile robots and, more particularly, to a system for allowing mobile robots to automatically discover visual features that specify relevant action possibilities. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent, or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

(1) Principal Aspects

Various embodiments of the invention include three "principal" aspects. The first is a system for automatic learning of relevant actions in mobile robots. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
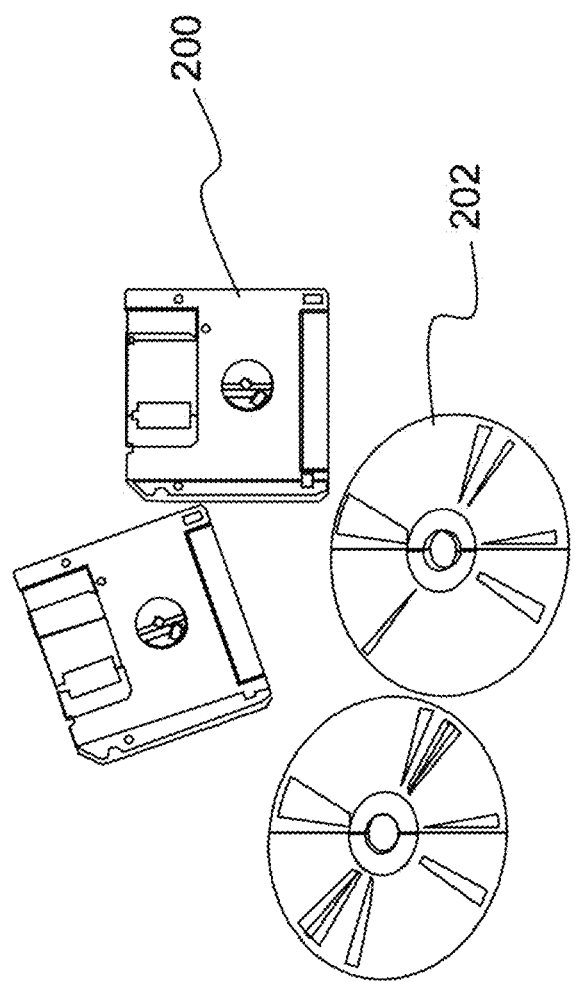
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e., computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(2) Specific Details of Embodiments of the Invention

The field of action-based perception attempts to create more meaningful perception by grounding perception in actions performed by an embedded and embodied agent. One or more embodiments of the present disclosure include a framework and initial realization developed using a simulated robot in a virtual environment. The demonstration of action-based perception focuses on the reachability affordance; that is, whether the robot can reach an object in the environment. Other non-limiting examples of affordances include graspability, passability, climbability, and pushability.

An autonomous platform (e.g., robot) was programmed to visit several objects in an environment, while training a vision autoencoder and an action autoencoder. A mapping layer from vision to action was trained only upon successful reaching events. The result is that the mapping layer encodes the reachability affordance. The encoding enables both perception of the corresponding action possibility and affordance-based control by encoding visual inputs and decoding them into action outputs, which may be a time series of joint angles.

Figure 3:
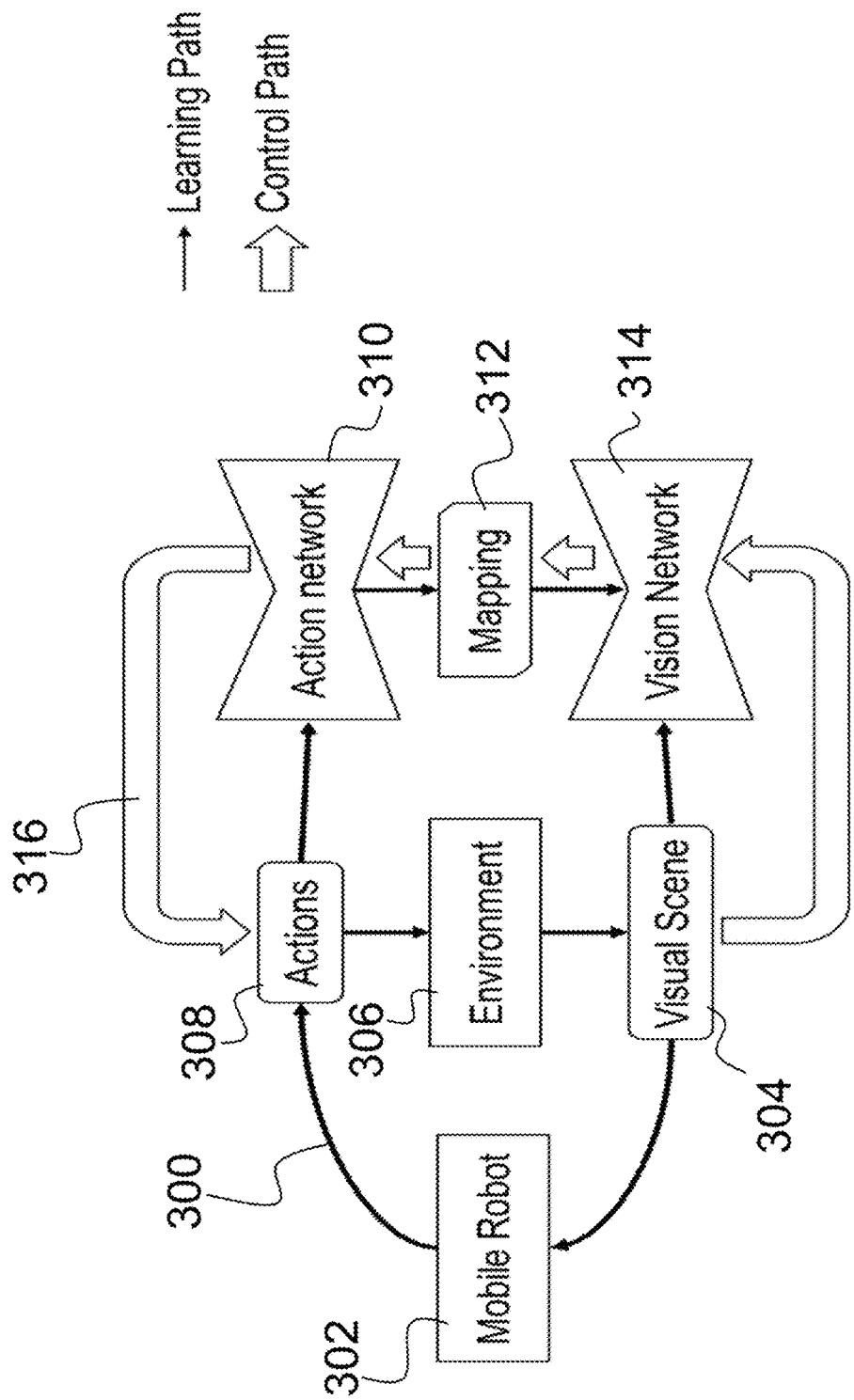
FIG. 3 is a flow diagram illustrating a system flow for automatic learning according to some embodiments of the present disclosure.

FIG. 3 is a flow diagram illustrating automatic learning according to one or more embodiments of the present disclosure. In the learning path (represented by thin arrows (e.g., arrow 300)), the mobile robot 302 receives, as input, a visual scene 304 (e.g., image) of the environment 306 via a visual sensor (e.g., camera) on the mobile robot 302. The mobile robot 302 then performs an action 308, such as forward movement or coming into contact with an object, that affects the mobile robot's perception of the environment 306. The actions 308 performed by the mobile robot 302 are used as input to respective autoencoders (i.e., action network 310). The mapping layer 312 and vision network 314 are updated when necessary. An autoencoder is an artificial neural network used to learn efficient codings of unlabeled data via unsupervised learning. In this example, the unlabeled data is the action performed. The encoding of the action based on data obtained from sensors on the mobile robot (e.g., joint sensors) is validated and refined by attempting to regenerate the input (i.e., the visual scene) from the encoding. The autoencoder then learns a representation (or encoding) for a set of data. In the control path (represented by wide arrows (e.g., arrow 316)), the process flow goes backwards from a visual scene 302 towards action 308, as depicted in FIG. 3. The control path is the process flow through the system that is active during operation. As a non-limiting example, a robotic actuator control may follow the control path.

The demonstration described above focuses on a single affordance, such as reaching an object, which results in a mapping layer that is specialized. A more realistic setting entails training the mapping layer when triggered by a variety of effects. In one or more embodiments, the mapping layer has a very high dimension (e.g., approximately 16.8 million dimensions), which can support multiple disjoint mappings (see Guang-Bin Huang, Yan-Qiu Chen and H. A. Babri, "Classification ability of single hidden layer feedforward neural networks," in IEEE Transactions on Neural Networks, vol. 11, no. 3, pp. 799-801, May 2000, which is hereby incorporated by reference as though fully set forth herein).

Triggering learning in the mapping layer is analogous to the biological effect of dopamine as a broadcast signal that affects neural plasticity. Certain states in the autonomous platform (e.g., mobile robot) may cause learning to be triggered, such as a salient spatio-temporal observation or an action of the autonomous platform. Following triggering, several affordances may be encoded in the mapping layer. In a more restricted setting, multiple mapping layers may be used, with corresponding, separate learning triggers. Such a configuration, while more complex in terms of parameters, may be preferred if more explicit explainability is a requirement. As understood to one skilled in the art, explainability is how a specific action is mapped from perception. In the non-explicit explainability case, many mappings would be mixed in the mapping layer, and there may be difficulty in extracting the mapping for a particular action.

Using the system according to embodiments of the present disclosure, a mobile robot (or other interacting agent) automatically discovers visual features in an environment that specify relevant action possibilities. Visual features may include texture gradients and edge features that specify whether an object is physically reachable by the agent/ mobile robot. The possible visual features are not specified a priori, but are learned, unsupervised, by interaction with the environment. In summary, the method described herein consists of learning a mapping from a visual latent space to an action latent space, then using the learned mapping to translate from visual features to action features.

(2.1) Architecture

Figure 4:
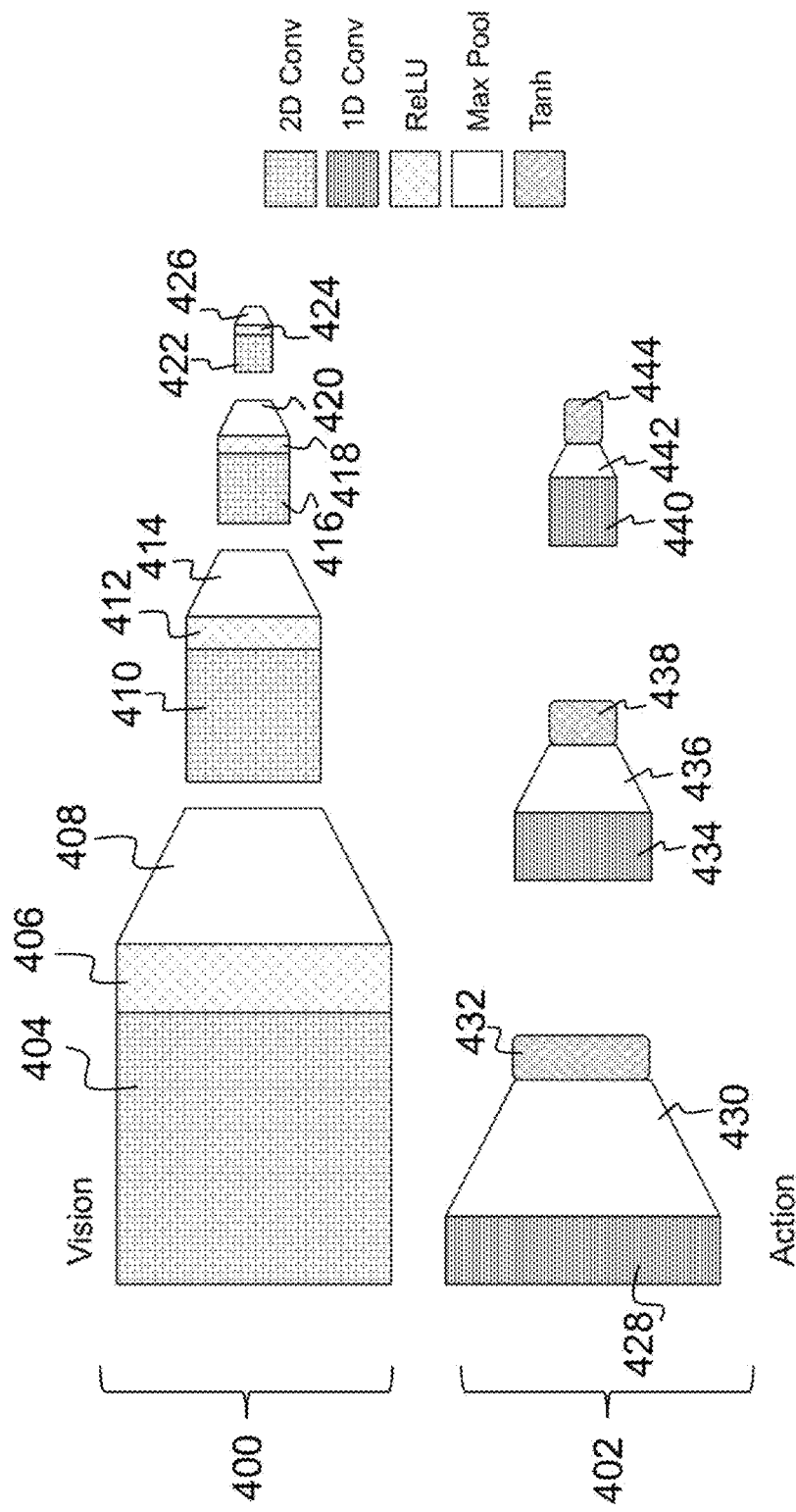
FIG. 4 is an illustration of a network architecture of action and vision autoencoders according to some embodiments of the present disclosure.

The architecture of the neural network having a vision autoencoder 400 and an action autoencoder 402 is depicted in FIG. 4. The encoding sides are shown, and the decoding sides are mirror-symmetric versions of the encoding sides. In one or more embodiments, the vision autoencoder 400 is composed of the following autoencoder layers with symmetric decoding layers and final sigmoid activation: 2D Conv 404, 3 inputs, 32 outputs, kernel-size 5; ReLU 406; 2D Max Pool 408 with stride 2; 2D Conv 410, 32 inputs, 64 outputs, kernel-size 5; ReLU 412; 2D Max Pool 414 with stride 2; 2D Conv 416, 64 inputs, 128 outputs, kernel-size 5; ReLU 418; 2D Max Pool 420 with stride 2; 2D Conv 422, 128 inputs, 256 outputs, kernel-size 5; ReLU 424; 2D Max Pool 426 with stride 2.

In one or more embodiments, the action autoencoder 402 is composed of the following encoding layers with symmetric decoding layers, except that unpooling chooses random indices: 10% dropout; 1D Conv 428, 10 inputs, 64 outputs, kernel-size 15; 1D Max Pool 430 with stride 2; tanh 432; 1D Conv 434, 64 inputs, 128 outputs, kernel-size 15; 1D Max Pool 436 with stride 2; tanh 438; 1D Conv 440, 128 inputs, 256 outputs, kernel-size 15; 1D Max Pool 442 with stride 2; and tanh 444.

Figure 5:
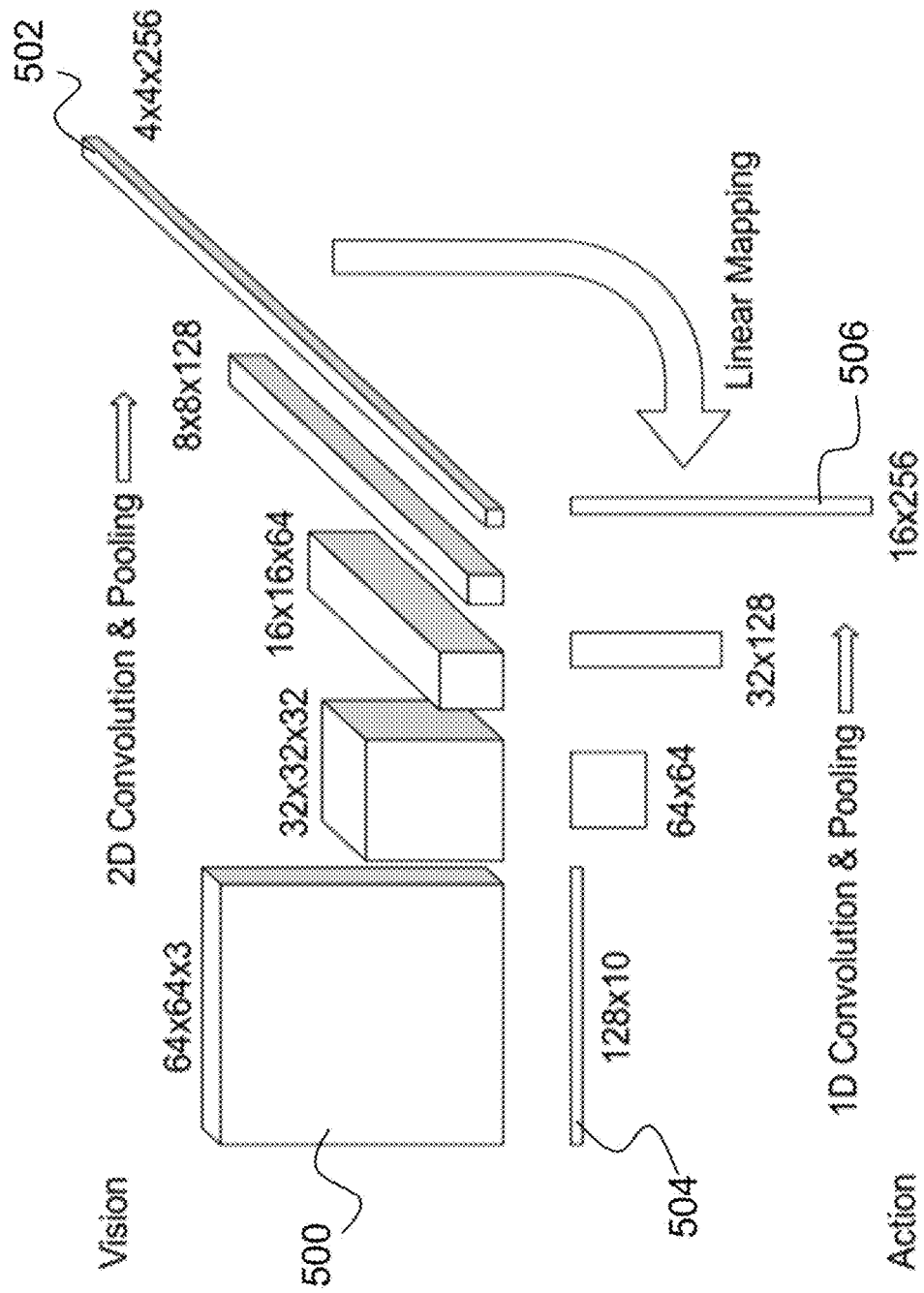
FIG. 5 is an illustration of the size of data as it flow through networks according to some embodiments of the present disclosure.

FIG. 5 illustrates an example of the size of data that flows through the networks. For example, the vision side may start with a 64×64 RGB image 500 and end with a 4096-element latent vector 502. The action side may start with a 128 time-step window of 10 action sensors 504 and end with a 4096-element latent vector 506.

The mapping layer is a simple linear layer of a matrix of size 4096×4096, which reflects the sizes of activations at the end of both of the vision and action autoencoders. Model loss is computed separately for vision, action, and mapping according to the following:

$$L_V(x, y) = \frac{1}{N}\sum_n^N y_n \log\sigma(x_n) + (1 - y_n)\log(1 - \sigma(x_n))$$

$$L_A(x, y) = \frac{1}{N}\sum_n^N |x_n - y_n|$$

$$L_M(x, y) = \frac{1}{N}\sum_n^N (x_n - y_n)^2,$$

where x and y represent output and target, respectively, $\Sigma$ represents the sigmoid function, N is the number of elements in x or y (which have the same size), and n is the index of a specific element. For each loss function, these correspond to a decoded image and an input image for $L_V$, a decoded action and input action for $L_A$, and mapped vision and encoded action for $L_M$. For $L_V$, x is the output (a decoded image), and y is the target (an input image).

Training the architecture is performed according to the following process:
    image_window=CircularBuffer(time_window)
    joint_window=CircularBuffer(time_window)
    for each time step:
        frame<-robot camera
        joints<-robot sensors
        addToWindow(image_window, frame)
        addToWindow(joint_window, joints)
        (V_D, A_D, A_E, M)=model(image_window[0], joint_window)
    loss=L_V(V_D,input_window[0])+L_A(A_D,joint_window)
        if salient_effect:
        loss+=L_M(M,A_E)
        else:
            disableMappingTraining(model)
        trainModel(model, loss),
    where V_D is decoded vision, A_D is decoded action, A_E is encoded action, and M is mapping output. Furthermore, loss values L_V, L_A, and L_M are computed according to the equations above. During training, a time window of 160 discrete samples was used with a time-step of 0.1, amounting to 16 seconds. However, this time window is an example and is not intended to limit the invention to any particular time window. The model accepts the entire window of joint sensors, but only the oldest image. This ensures that a visual input is paired with future action trajectories. After sufficient experience of the autonomous platform in a simulated world, the mapping layer learns affordance-like mappings from perceptual invariants to possible actions.

After training, action possibilities may be extracted by the following:

for each time step:
frame<-robot camera
decoded_action=model(frame,_),
where the model has been reduced to follow only the encode vision, map, decode action path.

(2.2) Experimental Studies
(2.2.1) Network Simulation

The network architecture described above, and shown in FIGS. 4 and 5, was simulated and trained using PyTorch (described in Paszke, A., Gross, S., Massa, F., Lerer, A., Bradbury, J., Chanan, G., & Chintala, S. (2019). "Pytorch: An imperative style, high-performance deep learning library", Advances in neural information processing systems, 32, 8026-8037, which is hereby incorporated by reference as though fully set forth herein) and run on a 3-GPU (graphic processing unit) workstation with NVidia Quadro RTX 8000 GPUs.

(2.2.2) Robot/Environment Simulation

Both autoencoders are trained throughout the simulation with typical loss functions, such as Binary Cross Entropy loss for vision and L1 loss for action. The total loss for the network is the sum of these two loss functions. When the robot's end-effector comes in physical contact with an object, the mapping layer loss, using Mean Square Error, is added to the total loss; otherwise, the event is ignored. In general, any action effect may be used to trigger the mapping layer training. The end-effector is the endpoint of a collection of controlled linkages. For instance, a robotic arm may be made up of shoulder, elbow, wrist, and finger; the finger-tip is the end-effector. There is only a training loss in the mapping layer on object contact.

(2.2.3) Affordance-Based Control

After training, the resulting mapping layer is used to demonstrate affordance-based control. Provided a sample visual input, the vision autoencoder is used to produce a latent vector. The latent vector is then mapped into the action latent space and decoded. The resulting actions show specificity to the reachability action possibility. In experimental studies, an image showing a close-up object produced no locomotion, and only arm-reaching movements of the robot. An image showing a far-away object produced forward locomotion of the robot.

Figure 6:
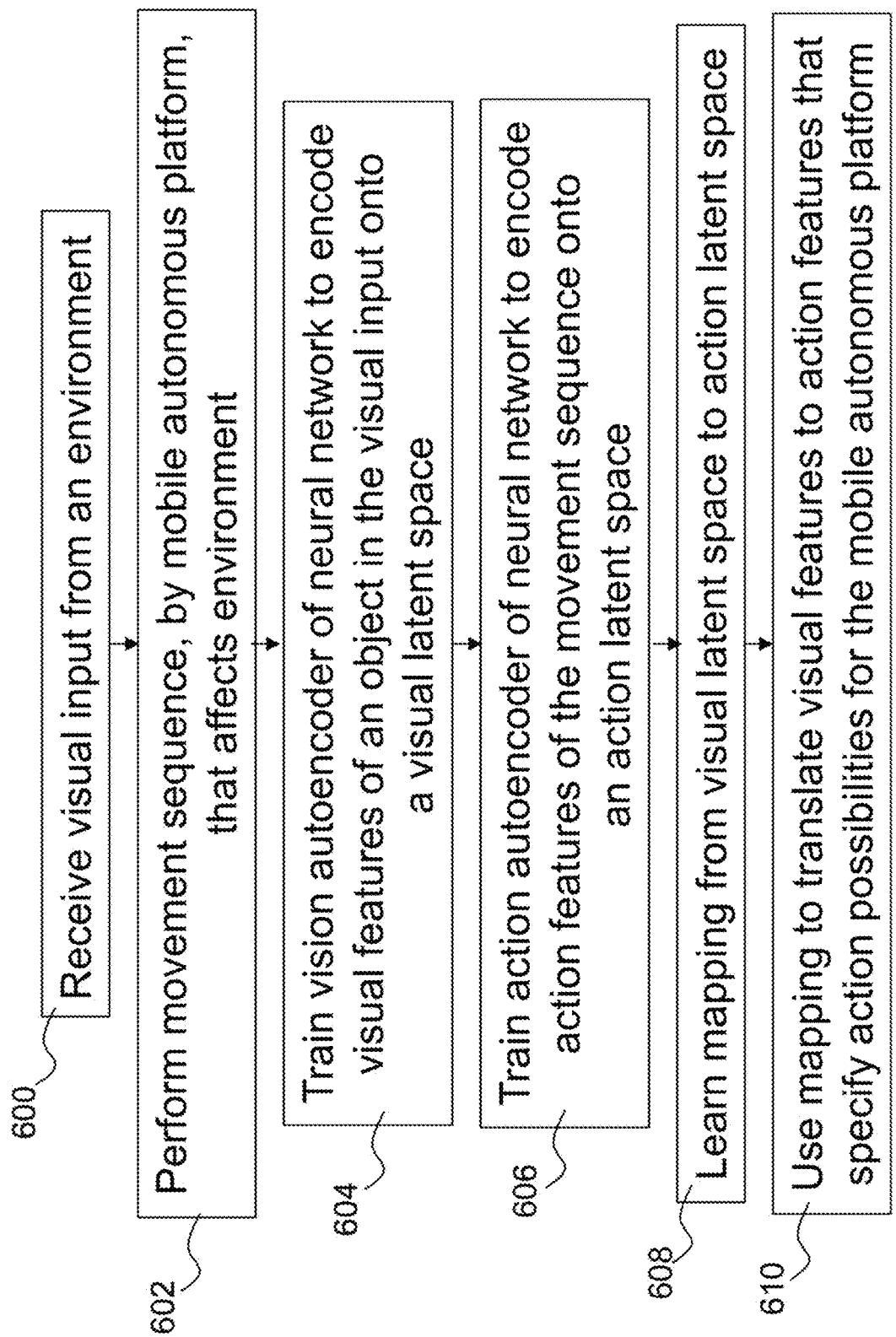
FIG. 6 is an illustration of a method for automatic learning of relevant actions in mobile autonomous platforms according to some embodiments of the present disclosure.

FIG. 6 illustrates a method for automatic learning of relevant actions in mobile autonomous platforms. As described above, in an initial step 600, a mobile autonomous platform receives a visual input related to an environment. In a subsequent step 602, the mobile autonomous platform performs a movement sequence that affects the environment. For instance, a movement sequence may include the extension of a portion of the mobile autonomous platform (e.g., arm) that causes movement or toppling of an object.

In a next step 604, a vision autoencoder of a neural network is trained to encode visual features of an object in the visual input onto a visual latent space. In a following step 606, an action autoencoder of the neural network is trained to encode action features of the movement sequence onto an action latent space. In another step 608, a mapping is learned from the visual latent space to the action latent space. In a subsequent step 610, the mapping is used to translate visual features to action features that specify action possibilities for the mobile autonomous platform.

FIGS. 7A-7D illustrate a non-limiting example of decoding from vision to action according to embodiments of the present disclosure. FIG. 7A illustrates an image of an object at a distance. FIG. 7B illustrates a decoded action for the object at a distance. Sensors 0 and 1 represent the left and right wheel, respectively, indicating forward movement. The right wheel shows greater activation, resulting in a slight left turn. This is likely the result of the robot's arm being right of center. FIG. 7C illustrates an image of a close object that is reachable by the robot. FIG. 7D illustrates a decoded action for the reachable object. The activation of sensors 2 and 3 between 8 and 10 seconds indicates a forward reaching of the arm.

The invention described herein has several advantages. For instance, objects are perceived not as a collection of features that are associated with an object label, but by features that are associated with agent-relevant action possibilities. This makes perception more flexible when encountering new instances of objects that share functional characteristics with previously seen objects. For instance, a cup may have an unusual shape that would make it difficult for a traditional system to identify it as a cup, but it retains the action possibilities inherent in "cupness", such as the ability to hold liquid, be held, and be tipped to release liquid. As such, objects are identified by their collection of action possibilities, instead of their specific appearance.

Having been trained by real action, the learning is well grounded semantically. By being grounded in semantics from the beginning, the problem of assigning semantics is avoided. Perception is more accurate and less prone to nonsensical errors that are common in traditional vision-only classification systems. The invention described herein is applicable to any system that would benefit from accurate perception, non-limiting examples of which include robotic system, autonomous driving, underwater manipulation, and vehicle navigation.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

The invention claimed is:

1. A system for automatic learning of relevant actions in mobile autonomous platforms, comprising:
a mobile autonomous platform programmed to receive a visual input related to an environment and perform a movement sequence that affects the environment based on the visual input;
a neural network in communication with the mobile autonomous platform, the neural network comprising:
a vision autoencoder trained, based on movements of the mobile autonomous platform, to encode visual features of a training object in the visual input onto a visual latent space;
an action autoencoder trained, based on movements of the mobile autonomous platform by the mobile autonomous platform, to encode action features of the movement sequence onto an action latent space; and a mapping layer between the vision autoencoder and the action autoencoder, wherein the mapping layer maps the visual latent space to the action latent space and, given a new object that shares visual features with the training object and given a new objective, translates the visual features of the new object to action features and associated action possibilities of the mobile autonomous platform to achieve the objective.

2. The system as set forth in claim 1, wherein the mapping layer encodes a series of action output controls for causing the autonomous platform to reach an object based on visual inputs from the autonomous platform to the training object.

3. The system as set forth in claim 1, wherein the visual input comprises visual features specifying action possibilities for reaching the training object in the environment.

4. The system as set forth in claim 1, wherein the visual features comprise texture gradients and edge features of the training object.

5. A method for automatic learning of relevant actions in mobile autonomous platforms, the method comprising:
receiving, by a mobile autonomous platform, a visual input related to an environment;
performing, by the mobile autonomous platform, a movement sequence that affects the environment;
training a vision autoencoder of a neural network to encode visual features of a training object in the visual input onto a visual latent space;
training an action autoencoder of the neural network to encode action features of the movement sequence onto an action latent space;
learning a mapping from the visual latent space to the action latent space;
using the mapping and given an objective, translating visual features from an instance of a new object that shares visual features with the training object to action features that specify action possibilities for the mobile autonomous platform to achieve the objective.

6. The method as set forth in claim 5, wherein the visual features comprise texture gradients and edge features of the training object.

7. The method as set forth in claim 5, further comprising training each of the vision autoencoder and the action autoencoder with a model loss function.

8. The method as set forth in claim 5, further comprising triggering training of a mapping layer of the neural network with a model loss function when the mobile autonomous platform physically contacts the training object in the environment.

9. The method as set forth in claim 8, wherein model loss is computed separately for the vision autoencoder, the action autoencoder, and the mapping layer.

10. The method as set forth in claim 9, further comprising determining model loss functions for vision, action, and mapping, respectively, according to the following:

$$L_V(x, y) = \frac{1}{N}\sum_n^N y_n \log\sigma(x_n) + (1 - y_n)\log(1 - \sigma(x_n))$$

$$L_A(x, y) = \frac{1}{N}\sum_n^N |x_n - y_n|$$

$$L_M(x, y) = \frac{1}{N}\sum_n^N (x_n - y_n)^2,$$

where for each loss function, x and y correspond to a decoded image and an input image for $L_V$, a decoded action and an input action for $L_A$, a mapped vision and encoded action for $L_M$, N is a number of elements in x or y, and n is an index of a specific element.

* * * * *